United States Patent
Tarhan

[15] 3,689,575
[45] Sept. 5, 1972

[54] METHANOL SYNTHESIS

[72] Inventor: Mehmet Orhan Tarhan, Bethlehem, Pa.

[73] Assignee: Bethlehem Steel Corporation

[22] Filed: Dec. 11, 1970

[21] Appl. No.: 97,367

[52] U.S. Cl. ................. 260/632 R, 23/213, 252/373, 260/449.5
[51] Int. Cl. ......................... C07c 31/04, C07c 31/06
[58] Field of Search .......... 260/632 R, 449.5; 23/213

[56] References Cited

UNITED STATES PATENTS 1,797,426    3/1931    Larson ........................ 23/213
3,539,298    11/1970   Fenton ........................ 23/213
3,615,355    10/1971   Skinner .................. 260/449.5

FOREIGN PATENTS OR APPLICATIONS 738,023    10/1955    Great Britain .......... 260/449.5
739,487    7/1966     Canada .................. 260/449.5

Primary Examiner—Leon Zitver
Assistant Examiner—Joseph E. Evans
Attorney—Joseph J. O'Keeffe

[57] ABSTRACT

A process for the synthesis of methanol in which water in liquid is reacted with gaseous carbon monoxide in the presence of a select carbon monoxide shift catalyst at temperatures of 180°–380° C. and pressures above about 250 atmospheres.

3 Claims, No Drawings

METHANOL SYNTHESIS

BACKGROUND OF THE INVENTION

This invention relates to methanol synthesis.

Methanol synthesis is well known in the art. However, prior art methanol synthesis has been directed to processes in which the reactants are gases. It has been customary, in prior art methanol synthesis, to have, as a first step, the production of synthesis gas. Synthesis gas, a mixture of hydrogen and carbon oxides, is obtained from such sources as the catalytic reaction of steam and natural gas, or the catalytic reaction of steam and carbon monoxide. When using carbon monoxide and steam as the raw materials for synthesis gas, carbon monoxide is reacted with steam in a gas phase reaction at pressures of 10–35 atmospheres and temperature from 180°–400° C. to produce hydrogen and carbon dioxide, according to the equation:

$$H_2O(steam) + CO \rightleftharpoons H_2 + CO_2 \quad (1)$$

The carbon dioxide of equation 1 is at least partially removed and the hydrogen produced by equation 1 reaction is then mixed with carbon monoxide to form methanol synthesis gas. The reaction of equation 1 is commonly called the carbon monoxide shift reaction. Reaction 1 is reversible and takes place in the gas phase in the presence of a catalyst such as chrome oxide promoted iron oxide or the binary and ternary combinations of the prereduced oxides of copper, zinc and chrome.

In the course of synthesizing methanol from synthesis gas, the synthesis gas is compressed, and then reacted over a catalyst to form methanol according to the equations:

$$CO + 2H_2 \rightleftharpoons CH_3OH \quad (2)$$

and $$CO_2 + 3H_2 \rightleftharpoons CH_3OH + H_2O \quad (3)$$

These prior art methods of methanol synthesis have many disadvantages.

The major disadvantage derives from the fact that a two-step synthesis (manufacture of synthesis gas followed by conversion of synthesis gas to methanol) is inherently complicated and costly.

A further disadvantage results from both steps of the prior art methanol synthesis being carried out in gas phase. Such a process requires the expense of handling and compressing large volumes of gaseous materials, including large amounts of steam.

Still another disadvantage of prior art methanol synthesis is that both synthesis steps provide exothermic reactions which must therefore be carefully controlled to prevent runaway reactions.

SUMMARY OF THE INVENTION

I have discovered that the aforementioned disadvantages of the prior art can be overcome by the one-step method of this invention in which carbon monoxide and liquid water are combined and catalytically reacted at pressures of about 250 to 700 atmospheres and temperatures from about 180° to about 380° C. Catalysts suitable for my method are binary combinations of oxides of copper and zinc, and copper and chrome, in their respective prereduced forms, and ternary combinations. The overall reaction equation is:

$$3\,CO + 2\,H_2O\,(liquid) \rightleftharpoons 2\,CO_2 + CH_3OH \quad (4)$$

In the practice of my method, I use catalysts which, heretofore, have been used exclusively for gas phase reactions.

The efficacy of the catalysts of my invention are unusual and unexpected. These aforementioned catalysts, designed exclusively for gas phase reactions, upon introduction into liquid water, tend to lose their solid structure and eventually acquire a powdery nature. I have discovered that, contrary to prior art teaching, they do not lose their activity.

My invention has the following advantages over the prior art synthetic processes:

First, it achieves the synthesis of methanol in one step, directly from carbon monoxide and liquid water, thus considerably simplifying the synthesis and drastically reducing its costs;

Second, the introduction of raw material water in liquid form eliminates the need for steam generation facilities and improves the thermal efficiency of the process;

Third, the lower exothermic heat of reaction simplifies the problem of heat removal. In addition, liquid-phase reactors lend themselves to efficient heat removal; these two factors lead to an overall reaction that is more readily controllable.

In the following examples, pressure refers to gauge unless otherwise noted.

DESCRIPTION OF THE PREFERRED EMBODIMENT

In the following specific example by which my method may be practiced, 25 grams of a catalyst consisting of the oxides of copper and zinc in prereduced form (Chemetron's G-66-RS) was mixed with 100 grams distilled water. Twenty-two and seven-tenths grams (22.7) of carbon monoxide (99.5 percent purity) was introduced into the water and catalyst mixture. The reaction was run in a batch shaking autoclave having a volume of about 300 cc at a pressure of 420 atmosphere, gauge, and a temperature of 295° C. for a period of 30 minutes. Under the reaction conditions the water was present predominately as a liquid with a density of about 45 lb/ft³. Analysis showed 19.65 percent of the carbon monoxide converted to methanol.

In a second example, 100 grams of distilled water and 22.7 grams of carbon monoxide were heated in the same batch reactor and in the same manner as example 1. Twenty-five grams of a catalyst consisting of the prereduced oxides of copper and chrome (Chemetron's GT-531 cu-chromite) were used and a temperature of 295° C. and a pressure of 420 atmosphere, gauge, was maintained for 30 minutes. Two and one-half (2.5) percent of the carbon monoxide was converted to methanol.

It is contemplated that the method of my invention could be practiced in a continuous manner by feeding liquid water through a preheating zone to a reaction zone of a pressure vessel. The pressure vessel would contain a stirred or slurried bed of prereduced copper oxide-zinc oxide or similar catalyst. Similarly, purified carbon monoxide would be fed continuously through a preheating zone to the reaction zone in a molar ratio of 3 carbon monoxide to 2 water. Reaction zone temperatures and pressure would be maintained at about 300°

C. and 400 atmospheres, gauge, respectively. Means, such as turbine-type gas dispersers, would be provided to bring about intensive contact between the gas and the liquid phases in the reaction zone. Reaction products would be withdrawn from the reaction zone, and would be processed by means well known in the art to remove the carbon dioxide, to purify the product methanol, and to recycle unreacted water to the reaction zone.

The stoichiometry of reaction 4 requires that 2 moles of carbon dioxide be removed from the reaction zone for 3 moles of carbon monoxide reacted. If, however, the feed gas contains some hydrogen, in addition to carbon monoxide, there is no need to remove all the carbon dioxide formed, since the hydrogen in the feed could react with it, and produce additional methanol.

I claim:

1. A process for synthesizing methanol comprising:
   a. reacting carbon monoxide with liquid water in the presence of a catalyst selected from the group consisting of prereduced mixed oxides of copper and zinc, copper and chromium, and copper, zinc and chromium at a temperature of about 180° to 380° C. and a pressure of about 250 atmospheres to about 700 atmospheres.

2. A process for synthesizing methanol comprising:
   a. forming a mixture of liquid water and a catalyst selected from the group consisting of the prereduced mixed oxides of copper and zinc, copper and chromium, and copper, zinc and chromium,
   b. introducing carbon monoxide into the mixture;
   c. reacting the carbon monoxide with the mixture at a temperature of about 180° to about 380° C. and a pressure of about 250 atmospheres to about 700 atmospheres to form methanol.

3. A process for synthesizing methanol comprising reacting liquid water with carbon monoxide in the presence of a catalyst consisting of the prereduced mixed oxides of copper and zinc at a temperature of about 300° C. and a pressure of about 420 atmospheres.

* * * * *